(12) United States Patent
Takacs

(10) Patent No.: US 10,271,391 B2
(45) Date of Patent: Apr. 23, 2019

(54) LIGHT EMITTING DIODE DRIVER

(71) Applicant: SORAA, Inc., Freemont, CA (US)

(72) Inventor: Laszlo Takacs, Fremont, CA (US)

(73) Assignee: SORAA, INC., Fremont, CA (US)

( * ) Notice: Subject to any disclaimer, the term of this patent is extended or adjusted under 35 U.S.C. 154(b) by 0 days.

(21) Appl. No.: 14/751,065

(22) Filed: Jun. 25, 2015

(65) Prior Publication Data

US 2016/0073455 A1 Mar. 10, 2016

Related U.S. Application Data

(60) Provisional application No. 62/016,899, filed on Jun. 25, 2014.

(51) Int. Cl.
*H05B 33/08* (2006.01)

(52) U.S. Cl.
CPC ..... *H05B 33/0815* (2013.01); *H05B 33/0845* (2013.01); *Y02B 20/346* (2013.01)

(58) Field of Classification Search
None
See application file for complete search history.

(56) References Cited

U.S. PATENT DOCUMENTS

| | | | | |
|---|---|---|---|---|
| 8,053,923 | B2 * | 11/2011 | Tateishi | H02M 3/07 307/10.8 |
| 2011/0101884 | A1 * | 5/2011 | Kim | H02M 3/155 315/294 |

* cited by examiner

*Primary Examiner* — Minh D A
*Assistant Examiner* — James H Cho
(74) *Attorney, Agent, or Firm* — Fisherbroyles LLP

(57) ABSTRACT

A driver for generating an output voltage to power an LED having a minimum operating voltage $V_{LED\ min}$, comprising: (a) a first voltage converting stage comprising an input terminal and an output terminal; (b) a charge storage device electrically connected to the output terminal and having a charge output voltage $V_C$; (c) at least one second voltage converting stage having an input electrically connected to the charge storage device, the second voltage converting stage being configured to increase said $V_C$ to at least $V_{LED\ min}$; and (d) at least one mode controller to switch between at least a first mode and a second mode, in the first mode, the first voltage converting stage charges the charge storage device to power the LED without substantial contribution from the second voltage converting stage, and, in the second mode, the second voltage converting stage power to the LED.

24 Claims, 6 Drawing Sheets

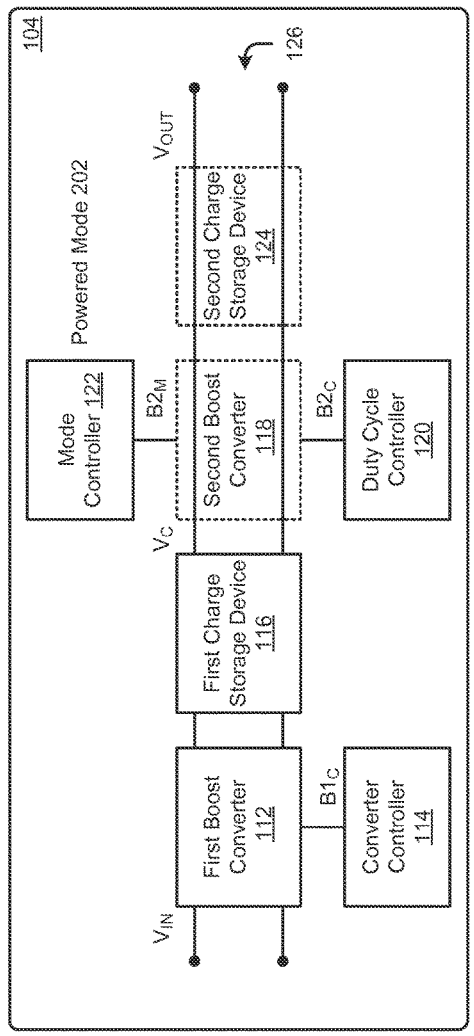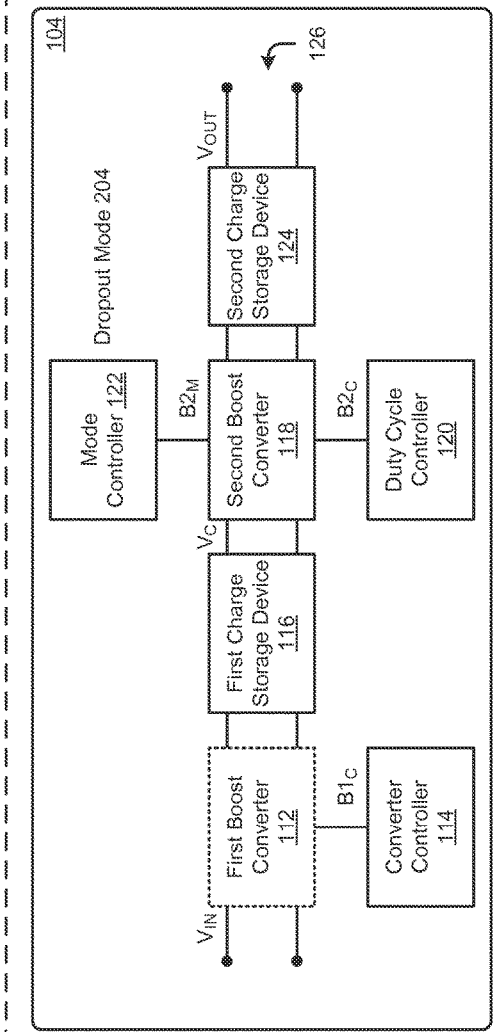

LIGHT EMITTING DIODE DRIVER

REFERENCE TO RELATED APPLICATION

This application claims priority to U.S. Provisional Application No. 62/016,899 filed Jun. 25, 2014, which is hereby incorporated by reference in its entirety.

FIELD OF DISCLOSURE

The disclosure relates to the field of LED illumination products and more particularly to high efficiency LED power converters or drivers.

BACKGROUND

As more light-emitting diode (LED) illumination systems penetrate the general lighting market, demands on performance, including efficiency, increase. LED-based illumination systems are not only expected to provide higher quality light over a longer operational life, but these LED-based illumination systems are also expected to do so efficiently across all applications. While much research and development in this area has been directed toward new LED materials, manufacturing equipment and processes, the converters or drivers that power the LED-based illumination systems significantly influence the overall efficiency of the systems.

LEDs used for illumination applications often require a regulated current at a voltage above a minimum level to deliver consistent (i.e., without periodic modulation or flicker) light output. The LED must also continue to operate without flicker even when disruptions or dropouts in the input power occur. To accommodate these requirements, conventional converter topologies deploy a two-stage arrangement having a boost converter followed by a buck converter. The boost converter is used since it can be designed to achieve a near-unity power factor (PF). To maintain this high PF, however, the boost converter output voltage, or intermediate voltage, must be at least twice the root mean square (RMS) of the input voltage, requiring the second step-down buck converter stage. The buck converter reduces the intermediate voltage to that required by the LED and also delivers a highly regulated, low ripple current into the LED to minimize flicker.

In this arrangement, the higher the intermediate voltage, the smaller the storage capacitor across the output of the boost converter required to hold the LED voltage through any dropout periods. However, as this voltage is increased, the converter becomes less efficient. In very small LED lamps such as the MR16, this leads to a very challenging tradeoff between efficiency, cost, and lamp size. Typical efficiencies for boost and buck converters with 3:1 transformation ratios are around 90%. Thus, the net efficiency of this combination is the product of the efficiency of the two stages, or approximately 81% (90%×90%).

Furthermore, the buck converter requires that the intermediate voltage (the voltage output of the boost stage), be significantly higher than the minimum operational LED voltage. This results in a significant amount of energy stored in the boost capacitor that cannot be extracted by the buck converter to hold up the LED. This again leads to having to size the energy storage components of the converters larger than desired.

Applicant therefore identifies a need to power LEDs without flicker or dropout, and yet provide high efficiency. The present invention fulfills this need among others.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Embodiments of the present invention relate to an LED power converter having two boost converter stages, arranged and controlled to provide improved power efficiency as well as a high power factor (PF), dropout tolerance, and optimal sizing and use of energy storage components. The high efficiency is generally achieved by having only one boost stage operational during a given period. The first boost stage is on during periods when input power is present, whereas the second boost stage is on during periods when input power is low or off (i.e., "dropout"). The first boost stage delivers a high PF to power the LED during powered periods, whereas the second boost stage uses energy from the energy storage components to power the LED during dropout periods. These attributes make certain embodiments of the present invention ideal for small, hot LED lamps, such as the MR16 LED replacement lamp.

In one embodiment, the present invention relates to a driver for generating an output voltage $V_{out}$ to power at least one light emitting diode (LED) having a minimum operating voltage $V_{LED\ min}$, the driver comprising: (a) at least one first voltage converting stage comprising an input terminal for receiving an input voltage $V_{IN}$ and an output terminal, and being configured to increase the $V_{IN}$ to a first output voltage $V_{1st}$ at the output terminal; (b) at least one charge storage device electrically connected to the output terminal and having a charge output voltage $V_C$; (c) at least one second voltage converting stage having an input electrically connected to the charge storage device, the second voltage converting stage being configured to increase the $V_C$ to at least $V_{LED\ min}$; and (d) at least one mode controller to switch between at least a first mode and a second mode, in the first mode, the first voltage converting stage charges the charge storage device to power the LED without substantial contribution from the second voltage converting stage, and, in the second mode, the second voltage converting stage powers the LED.

In another embodiment, the present invention relates to a method of powering at least one light emitting diode (LED) having a minimum operating voltage $V_{LED\ min}$ using a driver comprising a first voltage converting stage comprising an input terminal for receiving an input voltage $V_{IN}$ and an output terminal, and being configured to increase the $V_{IN}$ to a first output voltage $V_{1st}$ at the output terminal; a charge storage device electrically connected to the output terminal and having an charge output voltage $V_C$; a second voltage converting stage having an input electrically connected to the charge storage device, the second voltage converting stage being configured to increase the $V_C$ to at least $V_{LED\ min}$, the method comprising: (a) operating the driver in a first mode in which the first voltage converting stage charges the charge storage device to power the LED without substantial contribution from the second voltage converting stage; and (b) operating the driver, in a second mode in which the second voltage converting stage powers the LED.

BRIEF DESCRIPTION OF THE DRAWINGS

Those skilled in the art will understand that the drawings, described herein, are for illustration purposes only. The drawings are not intended to limit the scope of the present disclosure.

FIG. 2A depicts a diagram of a driver operating in a powered mode, according to some embodiments.

FIG. 2B depicts diagram of a driver operating in a dropout mode, according to some embodiments.

DETAILED DESCRIPTION

Figure 1:
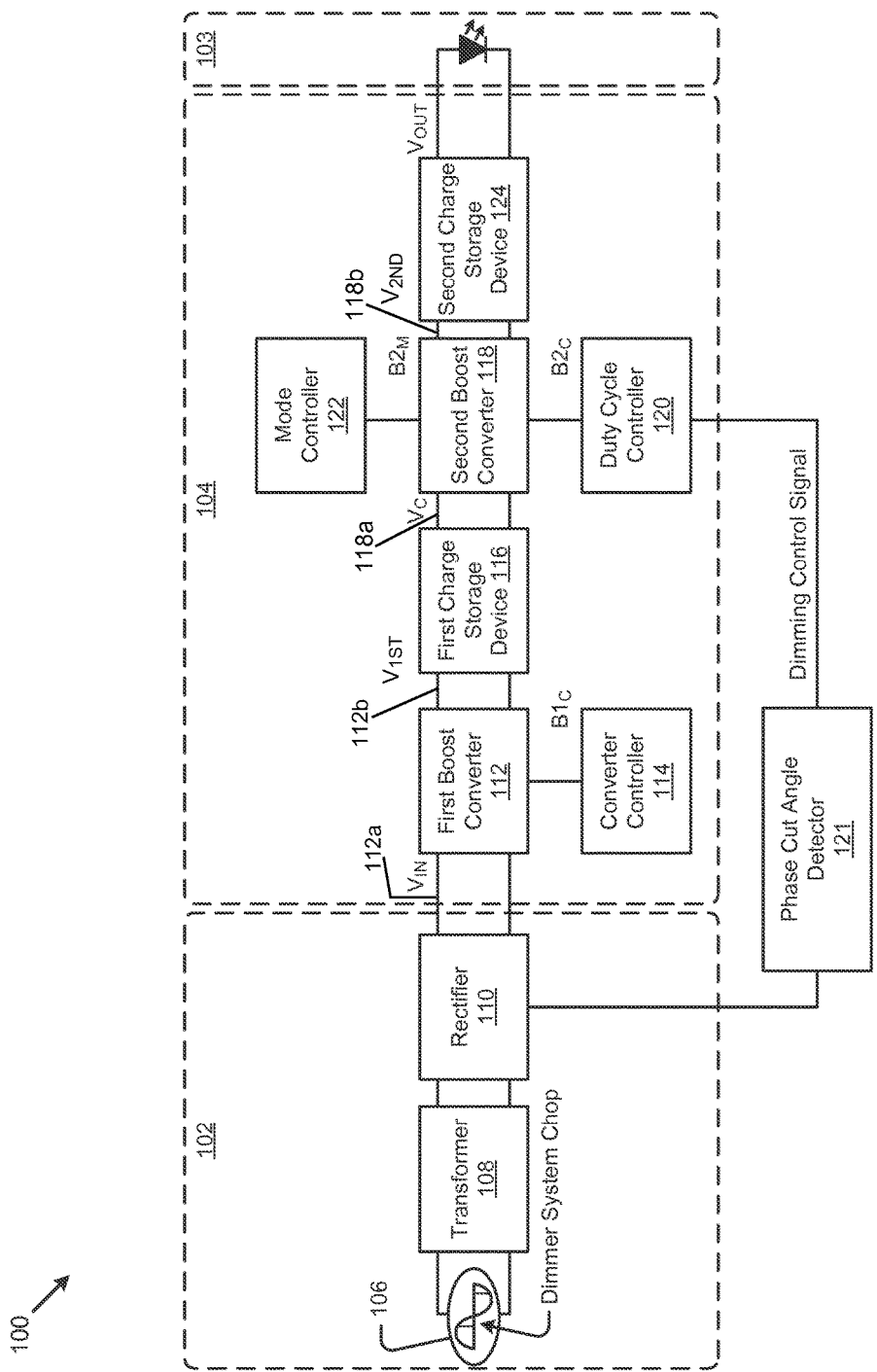
FIG. 1 depicts a system including an LED illumination system employing a driver, according to some embodiments.

Referring to FIG. 1, a schematic of one embodiment of the LED driver 104 of the present invention is shown. 1. Specifically, the driver 104 generates an output voltage $V_{out}$ to power at least one light emitting diode (LED) 103 having a minimum operating voltage $V_{LED\ min}$. The driver comprises a first voltage converting stage (or first boost stage) 112 comprising an input terminal 112a for receiving an input voltage $V_{IN}$ and an output terminal 112b, and being configured to increase the $V_{IN}$ to a first or intermediate voltage $V_{1st}$ at the output terminal. The output terminal is electrically connected to a charge storage device 116, which has a charge output voltage $V_C$. The driver also comprises a second voltage converting stage (or second boost stage) 118 having an input 118a electrically connected to the charge storage device. The second voltage converting stage is configured to increase $V_C$ to at least $V_{LED\ min}$. The first and second voltage converting stages are regulated by a mode controller 122, which switches between at least a first mode and a second mode. In the first mode, the first voltage converting stage charges the charge storage device to power the LED without substantial contribution from the second voltage converting stage, and, in the second mode, the second voltage converting stage powers the LED. These features and select alternative embodiments are described in greater detail below. The disclosed embodiments are not intended to be limiting of the claims.

Referring back to FIG. 1, an LED system 100 is depicted which incorporates the driver 104 described above. The system 100 includes a power conditioning front end 102, the driver connected to the power conditioner 102, and an LED load 103 connected to the driver 104.

The purpose of the power conditioning front end 102 in system 100 is to provide input power with a direct current (DC) and voltage $V_{IN}$ to driver 104. The power conditioning front end 102 comprises a transformer 108 that accepts power from an alternating current (AC) source 106. The AC source 106 may be sinusoidal power, or "chopped" power as may be provided by a dimmer switch (e.g., see dimmer system chop, as shown). As is known in the art, a sinusoidal power cycle can be chopped by a dimming system where the sinusoidal wave is chopped (e.g., chopped down to zero) a controlled amount, responsive to operation of the dimming system controls. The extent of the chopped portion is denoted as a "phase angle" ranging from 0 degrees (no chop down) to 180 degrees (complete cutout of the power). Such dimming systems may chop out a portion of the leading-edge of the waveform (e.g., triac dimmers) or may chop out a portion of the trailing edge of the waveform (or some combination of the two). Transformer 108 can be of an electronic or magnetic type, and can have various transformation ratios depending on the target implementation of system 100.

A rectifier 110 receives the AC signal at the output of transformer 108 and rectifies it to a DC signal having Vin at the output of rectifier 110. For example, in one embodiment, Vin is 17 Volts peak DC rectified from a 12 VAC transformer output at a frequency of 60 Hz.

The LED load 103 may comprise, for example, a single LED or an array of LEDs arranged in a series, in parallel, or in a combination thereof. Some LED loads (e.g., for illumination applications) require a driver 104 to provide a well regulated drive current within an operational voltage range at a target power, $P_{OUT}$. The operational voltage range is characterized by a minimum voltage $V_{LED\ min}$ determined by the LED device type and arrangement comprising LED load 103. $V_{LED\ min}$ values are well known, readily available characteristics of an LED. Typical values for $V_{LED\ min}$ are 20 Volts-30 Volts.

The driver 104 receives DC input power $V_{IN}$ at an input terminal 112a. The driver 104 functions to increase the voltage of $V_{IN}$ (e.g., 12 v) to an output voltage $V_{OUT}$. Typical $V_{OUT}$ values are, for example, 20, 25, and 30 VDC. In one embodiment, the driver comprises at least two voltage converting stages 112, 118, wherein only one stage operates at given period. The first boost stage is on during periods when input power is present, whereas the second boost stage is on during periods when input power is low or off (i.e., "dropout" or "cutoff"). The first boost stage delivers a high PF to power the LED during powered periods, whereas the second boost stage uses an increased amount of energy from the energy storage components to help power the LED during dropout periods.

The first voltage converting stage 112 may be any known electronics to increase or boost voltage, suitable electronics include, for example, boost, buck-boost, flyback, Cuk, sepic or other converter topologies.

In one embodiment, the first voltage converting stage 112 is controlled by a first converter controller 114, which regulates the "duty cycle" of the stage, or, in other words, turns the main switch of the first voltage converting stage 112 on and off to control $V_{1st}$. Specifically, the first converter controller 114 is connected to first voltage converting stage 112 to monitor signals, provide signals, and provide feedback (e.g., pulse-width modulated (PWM) feedback) to enable first voltage converting stage 112 to deliver a regulated current to a first charge storage device 116. A representative signal connecting first converter controller to first voltage converting stage 112 is shown as signal $B1_C$. Signal $B1_C$ represents a feedback signal (e.g., the PWM signal controlling first voltage converting stage).

The first charge storage device 116 serves to store the output from the first voltage converting stage, and, in one embodiment, serves to provide constant, stable power at Vc to (1) the output terminal in the first mode, and (2) the second voltage converting stage in the second mode. The first charge storage device may be implemented using any known electrical storage device including, for example, a capacitor or a battery. In one embodiment, the first storage device is a capacitor.

In one embodiment, the first voltage converting stage and the first charge storage device are configured to match substantially Vc (in the first mode) with the operating voltage of the LED to improve the efficiency of the driver. (It is generally known that efficiency of a boost circuit decreases as the ratio of the output voltage to input voltage increases) Specifically, Vc is essentially at the voltage needed to operate the LED (e.g., $V_{LED(min)}$). To match Vc with the operating voltage of the LED, in one embodiment, the boost ratio of first voltage converting stage is between about 1.2 to about 10, and, in a more particular embodiment, the boost ratio is about 2 to about 20.

The first storage device should be sized to provide adequate power to the second voltage converting stage during the second mode. In one embodiment, the system operates in the second mode when Vin drops below a certain level for a certain period (discussed in detail below). Accordingly, the power storage capacity of the device depends on the expected duration of a low Vin condition. For example, in one embodiment, the size of a capacitor ($C_{Size}$) representing first charge storage device 116 can be calculated by Equation (1):

$$C_{Size} = \frac{2 \times P_{OUT} \times T_{DROP}(\max)}{\eta \times (V_C(\text{nom})^2 - V_{BOOST}(\min)^2)} \quad (1)$$

Where, $P_{OUT}$ is the output power of the second voltage converting stage, and η is the efficiency of second voltage converting stage 118 which will be providing $P_{OUT}$, $T_{DROP\ MAX}$ is the maximum duration of $V_{IN}$ being below $V_{RMS\ min}$, $V_{C(nom)}$ is nominal voltage on said capacitor, and $V_{BOOST(min)}$ is the lowest permissible Vc.

Thus, as $T_{DROP}$(max) increases so should the size of the capacitor. An example of sizing the capacitor or other charge storage device is provided below in connection with FIG. 4B. The driver 104 further comprises a second voltage converting stage 118, a second converter controller (e.g., duty cycle controller 120), a mode controller 122, and a second charge storage device 124.

The second voltage converting stage 118 receives input power from the output of the first charge storage device. The second voltage converter stage functions to increase the voltage from Vc to the operating voltage of the LED. Like the first voltage converter stage, the second voltage converting stage may be any known electronics to increase or boost voltage, suitable electronics include, for example, boost, buck-boost, flyback, Cuk, sepic or other converter topologies. It should be noted with respect to the second voltage converting stage, that the boost ratio will change as Vc drops during the second mode. That is, during the second mode, while the second voltage converting stage is drawing power from the first charge storage device, Vc will drop (discussed in detail below with respect to FIG. 4B), requiring the boost ratio to increase to provide sufficient Vout for the LED.

In one embodiment, a second converter controller 120 is used to control the second voltage converting stage by controlling, for example, the duty cycle of the second stage. Specifically, in one embodiment, the controller 120 is connected to a second voltage converting stage 118 to monitor signals, provide signals, and provide feedback (e.g., PWM feedback) to enable the second voltage converting stage 118 to deliver a regulated current to the LED 103 or, optionally, to a second charge storage device 124. A representative signal connecting second converter controller 120 to second voltage converting stage 118 is shown as signal $B2_C$. Signal $B2_C$ represents a feedback signal (e.g., the PWM signal controlling second voltage converting stage 118).

Mode controller 122 is connected to second voltage converting stage 118 to monitor voltages and provide signals to enable second voltage converting stage 118 to operate in various modes. Signal $B2_M$ is shown connecting mode controller 122 to second voltage converting stage 118. Signal $B2_M$ can serve as the mode indicator signal to control the mode of second voltage converting stage 118. In some embodiments, the mode controller includes connections to multiple nodes within the driver 104. In some embodiments, second voltage converting stage 118 operates in two modes: a powered mode (or passive mode, see FIG. 2A) and in a dropout mode (or active mode, see FIG. 2B). In one embodiment, the first voltage converting stage is on during the second mode, and, in another embodiment, is on continuously, although in these embodiments, it may not be actually operating due to a voltage dropout condition.

In one embodiment, the first and second voltage converting stages are operatively connected to a driver output terminal having $V_{out}$, and $V_{out}$ remains essentially constant during the first and second modes.

In one embodiment, a second charge storage device 124 is connected to the output of the second voltage converting stage. Like the first charge storage device 116, can be implemented using a capacitor. Such a second charge storage device 124 supports the voltage $V_{OUT}$ produced by second voltage converting stage 118 (e.g., to drive LED load 103).

In a dimmer system (e.g., triac) and similar embodiments, the system 100 may also comprise a phase cut angle detector 121 to sense power carrying signals from the rectifier 110, to determine characteristics of the power carrying signals as modulated (e.g., chopped) by the dimming system, and to send a signal to the second controller. The second controller in turn determines the periods of drop-out and controls the second voltage converting stage and/or mode controller so as to operate the active mode of the second voltage converting stage 118 only during the dropout periods.

The operation of the drive 104 and system 100 is considered with respect to FIGS. 2A and B, FIG. 3 and FIGS. 4A-C.

FIG. 2A depicts a diagram 2A00 of a driver 104 operating in the first mode or a powered mode 202. In powered mode 202, second voltage converting stage 118 and a second charge storage device 124 can be configured by mode controller 122 to effectively deliver the regulated current and voltage $V_C$ available at first charge storage device 116 directly to converter output 126. In powered mode 202, driver 104 therefore functions as a single-stage converter, delivering the high efficiencies that characterize that configuration. In some embodiments, driver 104 accepts a $12V_{rms}$ input at $V_{IN}$ and steps it up to $36V_{rms}$ with first voltage converting stage 112 serving to directly drive the required LED voltage and current at converter output 126. At this 3:1 step-up ratio, first voltage converting stage 112 can be designed to provide a very high PF and can achieve about 90% efficiency.

FIG. 2B depicts a diagram 2B00 of driver 104 operating in the second mode or a dropout mode 204. In some embodiments, dropout mode 204 is enabled when the input voltage at $V_{IN}$ is measured to be in a low voltage range (e.g., in a dropout condition). Under these conditions, first voltage converting stage 112 has insufficient input power to continue to holdup the voltage $V_C$ at the first charge storage device 116. Second voltage converting stage 118 and second charge storage device 124 are therefore configured by mode controller 122 to draw the remaining energy from first charge storage device 116 and drive the required LED voltage and current at converter output 126. In dropout mode, driver 104 therefore also serves to function as a single-stage converter, delivering the high efficiencies of that configuration. In some embodiments, the transformation ratio of second voltage converting stage 118 is near unity since the voltage $V_C$ across first charge storage device 116 is designed to be within the operational voltage range of the LED. At this low step-up ratio, second voltage converting stage 118 can be designed to achieve about 95% efficiency.

Figure 3:
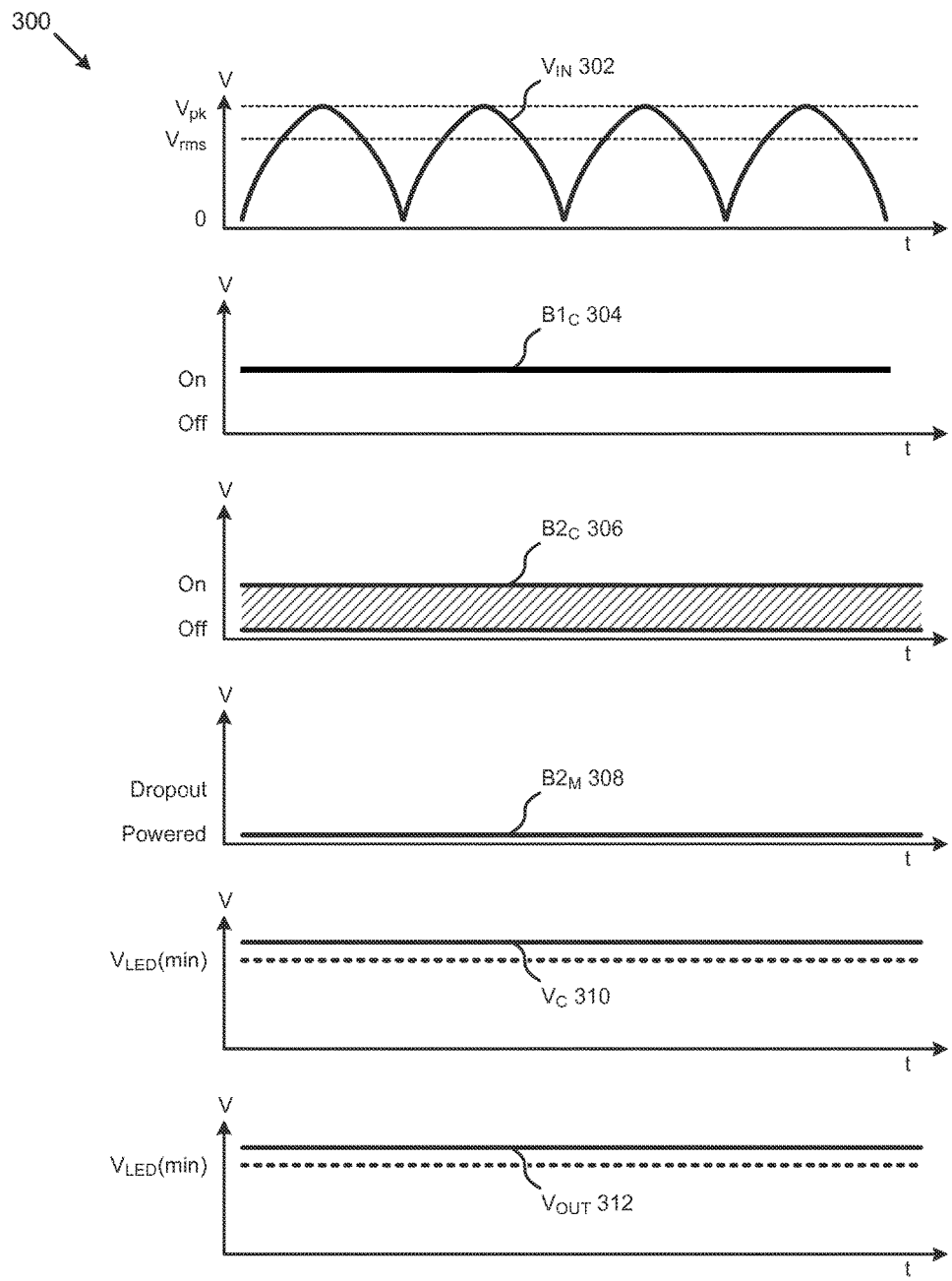
FIG. 3 presents annotated waveforms showing operation of a driver with continuous input power, according to some embodiments.

FIG. 3 presents annotated waveforms 300 showing operation of a driver 104 with continuous input power, according to some embodiments. All waveforms shown in FIG. 3 have the same horizontal axis showing the same period of time and are shown in the same scale. As shown in FIG. 3, the $V_{IN}$ voltage 302 is a voltage signal representing a fully-rectified, continuous sinusoidal power input having a steady state RMS voltage of $V_{rms}$. As shown, the $V_{IN}$ voltage 302 provides power to the driver 104, and the $B2_M$ control signal 308 stays low to configure the driver 104 to powered mode 202. The $B1_C$ PWM signal 304 can operate with up to a 100% duty cycle so as to attempt to draw power from the line at all times. Alternatively the $B1_C$ PWM signal 304 can operate the duty cycle to allow first voltage converter 112 to deliver $V_C$ 310 and the $V_{OUT}$ 312 that is within the LED operational voltage range. During the time duration that second voltage converting stage 118 is in powered mode 202, the $B2_C$ signal 306 state can be undefined.

Figure 4A:
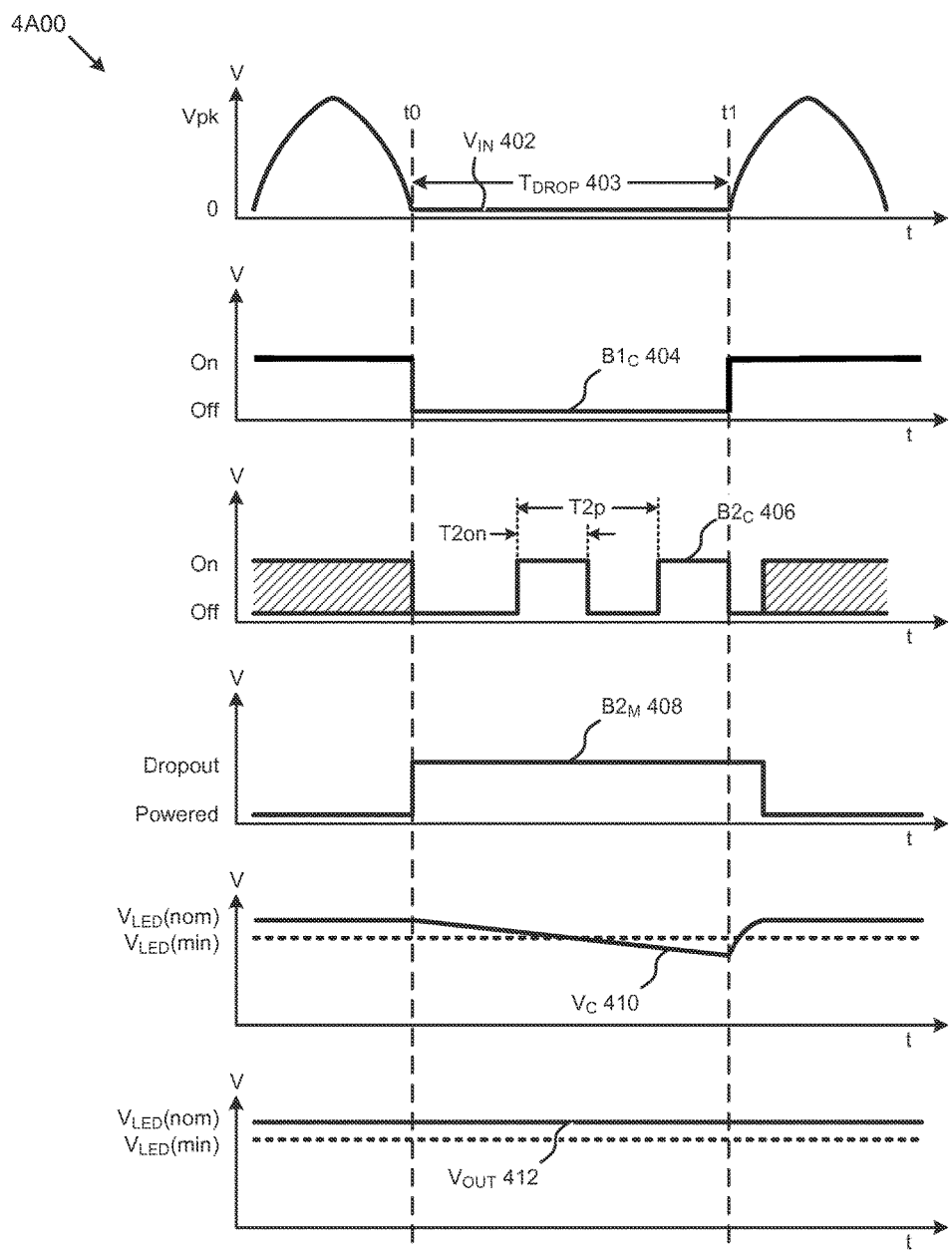
FIG. 4A presents annotated waveforms showing operation of a driver with input power dropout, according to some embodiments.

FIG. 4A presents annotated waveforms 4A00 showing operation of a driver 104 with input power dropout, according to some embodiments. All waveforms shown in FIG. 4 have the same horizontal axis showing the same period of time and are shown in the same scale. As shown in FIG. 4A, the $V_{IN}$ voltage 402 depicts an entire AC cycle throughout which cycle no power is available to the driver 104. For a 60 Hz input power frequency, the $T_{DROP}$ dropout period 403 is approximately 16.7 ms. When mode controller 122 senses this drop in $V_{IN}$ voltage 402, it drives the $B2_M$ control signal 408 high to configure driver 104 to dropout mode 204. The $B1_C$ PWM signal 404 duty cycle will decrease significantly during $T_{DROP}$ dropout period 403 to attempt to keep the $V_C$ voltage 410 and the $V_{OUT}$ voltage 412 within the LED operational voltage range. However, first voltage converting stage 112 is ineffective, even at 0% duty cycle when no input power is present, so the $B2_C$ signal 406 therefore begins to operate with a duty cycle to allow second voltage converting stage 118 to step up the $V_C$ voltage 410 to a $V_{OUT}$ voltage 412 that is within the LED operational voltage range. Even though $V_C$ voltage 410 falls below $V_{LED}$(min), second voltage converting stage 118, in combination with a sufficiently-sized charge storage device, is able to hold $V_{OUT}$ voltage 412 within the LED operational range. When the input power returns, the $B2_M$ control signal 408 goes low to configure the driver 104 back to powered mode 202.

In some embodiments, the driver 104 has a smaller (e.g., less expensive, smaller physical size) first charge storage device 116 than the charge storage devices in conventional converter topologies. In some embodiments, first charge storage device 116 can be a capacitor and is commonly called the "holdup capacitor" or "intermediate capacitor". A larger voltage drop occurs at $V_C$ voltage 410 during a given dropout period, thus a smaller first charge storage device 116 can be used by the driver 104 since a second voltage converting stage 118 can continue to drive an LED even when the voltage across the first charge storage device 116 drops below $V_{LED}$(min). More specifically, the function of the second voltage converting stage 118 allows the voltage drop at Vc voltage 410 to sag down well below $V_{LED}$(min) while still maintaining drive current to the LEDs. This in turn allows first charge storage device 116 to be substantially reduced in terms of capacitance and physical size. In contrast, conventional converter topologies using such smaller charge storage devices are not able to continue to drive the LED when this intermediate voltage is below $V_{LED}$(min)—conventional converter topologies need a relatively larger holdup charge storage capacity to avoid any disruptions in LED operation. Embodiments of driver 104 further enable other energy storage components and devices (e.g., inductors) to be smaller-sized, and in some cases, less expensive.

Figure 4B:
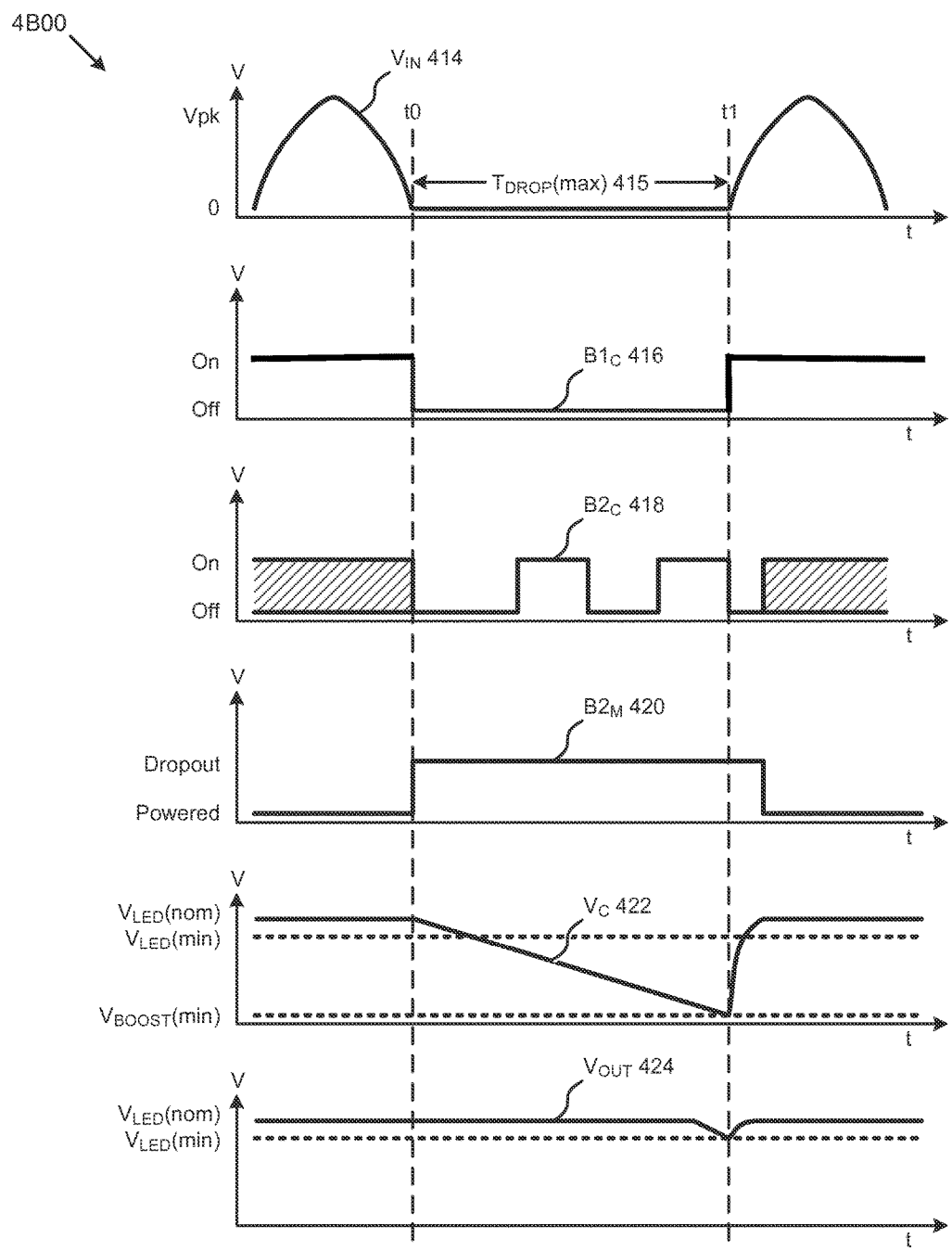
FIG. 4B presents annotated waveforms showing operation of a driver with an example of a worst case input power dropout, according to some embodiments.

FIG. 4B presents annotated waveforms 4B00 showing operation of driver 104 with an example of worst case input power dropout. In one embodiment of driver 104, the size of the holdup capacitor representing first charge storage device 116 can be determined from the conditions depicted in the waveforms in FIG. 4B. These conditions are intended to represent a worst case dropout condition of a particular embodiment of driver 104. As shown in FIG. 4B, the $V_{IN}$ voltage 414 exhibits a $T_{DROP}$(max) dropout period 415 during which no AC power is available to driver 104. During $T_{DROP}$(max) dropout period 415, the $V_C$ voltage 422 across first charge storage device 116 continues to drop from its nominal level $V_C$(nom) until input power returns.

Given the conditions described and illustrated in FIG. 4B for this embodiment, the size of a holdup capacitor ($C_{HOLDUP}$) representing first charge storage device 116 can be calculated by Equation (1) set forth above. Specifically, if $P_{OUT}$ is 10 W, $T_{DROP}$(max) is 16.7 ms or one 60 Hz AC power cycle, η is 95% for a low transformation ratio boost converter, $V_C$(nom) is 32V, and $V_{BOOST}$(min) is 16V to reflect an assumed maximum 2:1 transformation ratio design for second voltage converting stage 118, then $C_{HOLDUP}$ will be 458 µF.

Figure 4C:
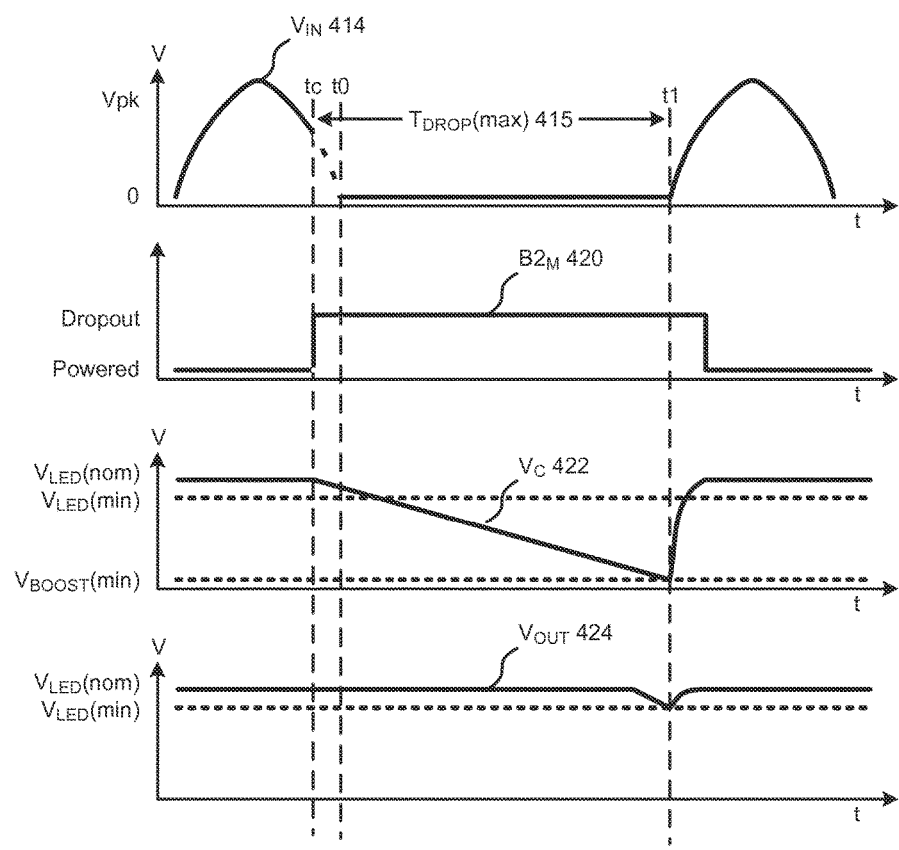
FIG. 4C presents annotated waveforms showing operation of a driver with an example of chopped input power, according to some embodiments.

FIG. 4C presents annotated waveforms 4C00 showing operation of a driver with an example of chopped input power, according to some embodiments. As shown, $V_{IN}$ voltage 414 is chopped by the dimming system beginning at time $t_C$. This extends the duration of $t_{DROP}$. The phase cut angle detector 121 senses the chopped nature of voltage 414 and determines characteristics of the power carrying signals as modulated (e.g., chopped) by the dimming system. For example, a shift in the phase (e.g., via a zero crossing) is detected, or the voltage levels are directly sensed and timed. The phase cut angle detector 121 sends a signal to duty-cycle controller 120 to cause the duty-cycle controller to assert $B2_M$ to indicate dropout mode at time $t_C$. Additional signaling from the phase cut angle detector 121 controls the second voltage converting stage 118 so as to lower the drive current to the LEDs to a level commensurate with the user's setting of the dimming control.

The driver configuration of the present invention is highly efficient. For example, during an extended period ($T_{TOTAL}$) of continuous operation of the system 100, it is expected (although not necessary) that the driver 104 be operated in the first mode for a period ($T_P$) that comprises the majority of $T_{TOTAL}$, while operating in the second mode (e.g., during voltage dropout) for a shorter period ($T_D$) only under certain conditions (e.g., in a dropout condition) of the aforementioned input voltages. With the overall efficiency of high efficiency driver 104 characterized by the first voltage converting stage 112 efficiency ($\eta_{B1}$) in the first or powered mode 202 (described above in connection with FIG. 2A), and characterized by the second voltage converting stage 118 efficiency ($\eta_{B2}$) in second mode or dropout mode 204 (described above in connection with FIG. 2B), the driver 104 average efficiency ($\eta_{AVG}$) can be calculated by Equation (2):

$$H_{AVG} = \frac{(T_P \times \eta_{B1}) + (T_D \times \eta_{B2})}{T_{TOTAL}} \quad (2)$$

If $T_P$ is 99% of $T_{TOTAL}$, $T_D$ is 1% of $T_{TOTAL}$, $\eta_{B1}$ is 90%, and $\eta_{B2}$ is 95%, then the driver 104 is therefore expected to exhibit an average efficiency $\eta_{AVG}$ of 90.05% during continuous operation.

Finally, it should be noted that there are alternative ways of implementing the embodiments disclosed herein. Accordingly, the present embodiments are to be considered as illustrative and not restrictive, and the claims are not to be limited to the details given herein, but may be modified within the scope and equivalents thereof.

What is claimed is:

1. A driver for generating an output voltage $V_{out}$ to power at least, one light emitting diode (LED) having a minimum operating voltage $V_{LED\ min}$, said driver comprising:
   at least one first voltage converting stage comprising an input terminal for receiving an input voltage $V_{IN}$ and an output terminal, and being configured to increase said $V_{IN}$ to a first output voltage at said output terminal;
   at least one charge storage device electrically connected to said output terminal and having a charge output voltage $V_C$;
   at least one second voltage converting stage having an input electrically connected to said charge storage device, said second voltage converting stage being powered by said at, least, one charge storage device and configured to increase said $V_C$ to at least $V_{LED\ min}$; and
   at least one mode controller configured to switch from a first mode to a second mode, said at least one mode controller switching from said first mode to said second mode during a dropout in said input voltage $V_{IN}$, in said first mode, said first voltage converting stage charges said charge storage device and powers said LED without substantial contribution from said second voltage converting stage, and, in said second mode, said second voltage converting stage powers said LED.

2. The driver of claim 1, wherein in said second mode, said second voltage converting stage powers said LED without substantial contribution from said first voltage converting stage.

3. The driver of claim 2, wherein said controller is configured such that said second voltage converting stage does not operate in said first mode, and said first voltage converting stage does not operate in said second mode.

4. The driver of claim 1, wherein said first and second voltage converting stages are operatively connected to a driver output terminal having said $V_{out}$, wherein said $V_{out}$ remains essentially constant during said first and second modes.

5. The driver of claim 1, further comprising:
   said LED electrically connected to said driver.

6. The driver of claim 5, wherein Vc is no less than said $V_{LED\ min}$ in said first mode.

7. The driver of claim 5, wherein Vc is less than said $V_{LED\ min}$ in said second mode.

8. The driver of claim 1, wherein in said second mode, said first voltage converting stage is on.

9. The driver of claim 8, wherein said first voltage, converting stage is always on.

10. The driver of claim 1, wherein, in said first mode, said $V_{IN}$ is no less than a minimum RMS voltage, $V_{RMS\ min}$, which is necessary for said first voltage converting stage to generate said $V_{LED\ min}$, and, in said second mode, $V_{IN}$ is less than said $V_{RMS\ min}$.

11. The driver of claim 1, wherein said first storage device comprises a capacitor having a size within 20% of $C_{size}$ based on said following equation:

$$C_{size} = \frac{2 \times P_{OUT} \times T_{DROP}(\max)}{\eta \times (V_C(\text{nom})^2 - V_{BOOST}(\min)^2)}$$

wherein
   $P_{OUT}$ is said output power in watts of said second voltage converter stage,
   $T_{DROP\ MAX}$ is the maximum duration of $V_{IN}$ being below $V_{RMS\ min}$
   $\eta$ is the efficiency of said second voltage converting stage,
   $V_{C(nom)}$ is nominal voltage on said capacitor, and
   $V_{BOOST(min)}$ is the minimum Vc.

12. The driver of claim 1, further comprising:
   first and second stage controllers connected to said first and second converting stages for controlling the duty cycle of said first and second converting stages.

13. The driver of claim 1, further comprising a second charge storage device, wherein said second storage device is electrically connected to said second voltage converting stage.

14. The driver of claim 1, further comprising:
   a phase cut angle detector for sensing a chopped Vin and sending a signal to a second controller to indicate voltage dropout.

15. The driver of claim 1, further comprising:
   an input conditioner connected to said input terminal of said first voltage converting stage and configured to rectify AC input to output said Vin on said input terminal.

16. The driver of claim 1, wherein said second voltage converting stage is powered by said at least one charge storage device and not by said an input voltage $V_{IN}$.

17. A method of powering at least one light emitting diode (LED) having a minimum operating voltage $V_{LED\ min}$ using a driver comprising a first voltage converting stage comprising an input terminal for receiving an input voltage $V_{IN}$ and an output terminal, and being configured to increase said $V_{IN}$ to a first output voltage at said output terminal; a charge storage device electrically connected to said output terminal and having a charge output voltage $V_C$; a second voltage converting stage having an input electrically connected to said charge storage device, said second voltage converting stage being configured to increase said $V_C$ to at least $V_{LED\ min}$, said method comprising:
   operating said driver in a first mode in which said first voltage converting stage charges said charge storage device and powers said LED without substantial contribution from said second voltage converting stage; and
   switching from said first mode to a second mode during a dropout in said input voltage $V_{IN}$, wherein, in said second mode, said second voltage converting stage increases said $V_C$ to at least $VLED_{min}$ to power said LED.

18. The method of claim 17, wherein Vc is no less than said $V_{LED\ min}$ in said first mode.

19. The method of claim 17, wherein said first voltage converting stage is always on.

20. The method of claim 17, wherein Vc is less than said $V_{LED\ min}$ in said second mode.

21. A driver for generating an output voltage $V_{out}$ to power at least one light emitting diode (LED) having a minimum operating voltage $V_{LED\ min}$, said driver comprising:
- at least one first voltage converting stage comprising an input terminal for receiving an input voltage $V_{IN}$ and an output terminal, and being configured to increase said $V_{IN}$ to a first output voltage at said output terminal;
- at least one charge storage device electrically connected to said output terminal and having a charge output voltage $V_C$;
- at least one second voltage converting stage having an input electrically connected to said charge storage device, said second voltage converting stage being configured to supply said $V_C$ to said at least one LED at least at said $V_{LED\ min}$; and
- at least one mode controller to switch between at least a first mode and a second mode, in said first mode, said first voltage converting stage charges said charge storage device and powers said LED without said second voltage converting stage substantially operating, and, in said second mode, said second voltage converting stage powers said LED without said first voltage converting stage substantially operating.

22. The driver of claim 21, further comprising:
said LED electrically connected to said driver.

23. The driver of claim 21, wherein Vc is less than said $V_{LED\ min}$ in said second mode.

24. The driver of claim 21, wherein said second voltage converting stage is configured to increase said $V_C$ to at least said $V_{LED\ min}$.

* * * * *